United States Patent

Cheng et al.

[11] Patent Number: 4,489,571
[45] Date of Patent: Dec. 25, 1984

[54] FRACTIONAL SOLIDIFICATION PROCESS AND APPARATUSES FOR USE THEREIN

[76] Inventors: Sing-Wang Cheng; Chen-Yen Cheng, both of 9605 LaPlaya St., NE., Albuquerque, N. Mex. 87111

[21] Appl. No.: 565,856

[22] Filed: Dec. 27, 1983

[51] Int. Cl.$^3$ .............................................. B01D 9/02
[52] U.S. Cl. ..................................................... 62/542
[58] Field of Search ............... 23/295 R, 296; 62/542, 62/544, 543, 538; 422/251

[56] References Cited

U.S. PATENT DOCUMENTS

| | | | |
|---|---|---|---|
| 2,540,083 | 2/1951 | Arnold | 62/542 |
| 3,234,747 | 2/1966 | McMahon et al. | 422/251 |
| 3,283,522 | 11/1966 | Ganiaris | 62/542 |
| 3,305,320 | 2/1967 | Weech | 62/542 |
| 3,379,028 | 4/1968 | Dale | 62/542 |
| 3,410,923 | 11/1968 | Strand et al. | 62/542 |
| 3,448,587 | 6/1969 | Goard et al. | 62/542 |
| 3,681,932 | 8/1972 | Huber et al. | 422/251 |
| 4,332,599 | 6/1982 | Thijssen et al. | 62/543 |

Primary Examiner—Hiram H. Bernstein

[57] ABSTRACT

The present invention introduces a process for effectively washing a crystal-liquid (mother liquor) mixture with a mass of wash liquid to thereby form a mass of highly purified crystals and also introduces apparatuses for use therein. The purification is accomplished by properly conducted alternative stationary and agitated crystal washing operations and substantially countercurrent transfer of the solid phase and the free liquid in a purification zone. The zone contains a set of stationary washing sub-zones and a set of agitated washing sub-zones that are laid alternatively along the vertical direction.

The mass of crystals in a stationary sub-zone is compacted by a compacting means to form a bed with an enhanced degree of compaction. The masses of crystals and liquid in each agitated sub-zone are properly agitated so that the impurities in the mother liquors retained in the crystal mass are released to the free liquid. It is important either to reduce the amount of liquid that is transferred with the crystals or counterwash the crystals during an inter sub-zone transfer of the solid phase. Means for accomplishing these functions are incorporated in the apparatuses of this invention. Because of the properly conducted alternative stationary and agitated washing operations and the properly conducted inter sub-zone transfers of the solid phases and the free liquids, the impurity concentrations of the liquids retained in the solid phases transferred between sub-zones decrease sequentially, nearly following a geometric sequence rather than approaching a limiting value.

30 Claims, 13 Drawing Figures

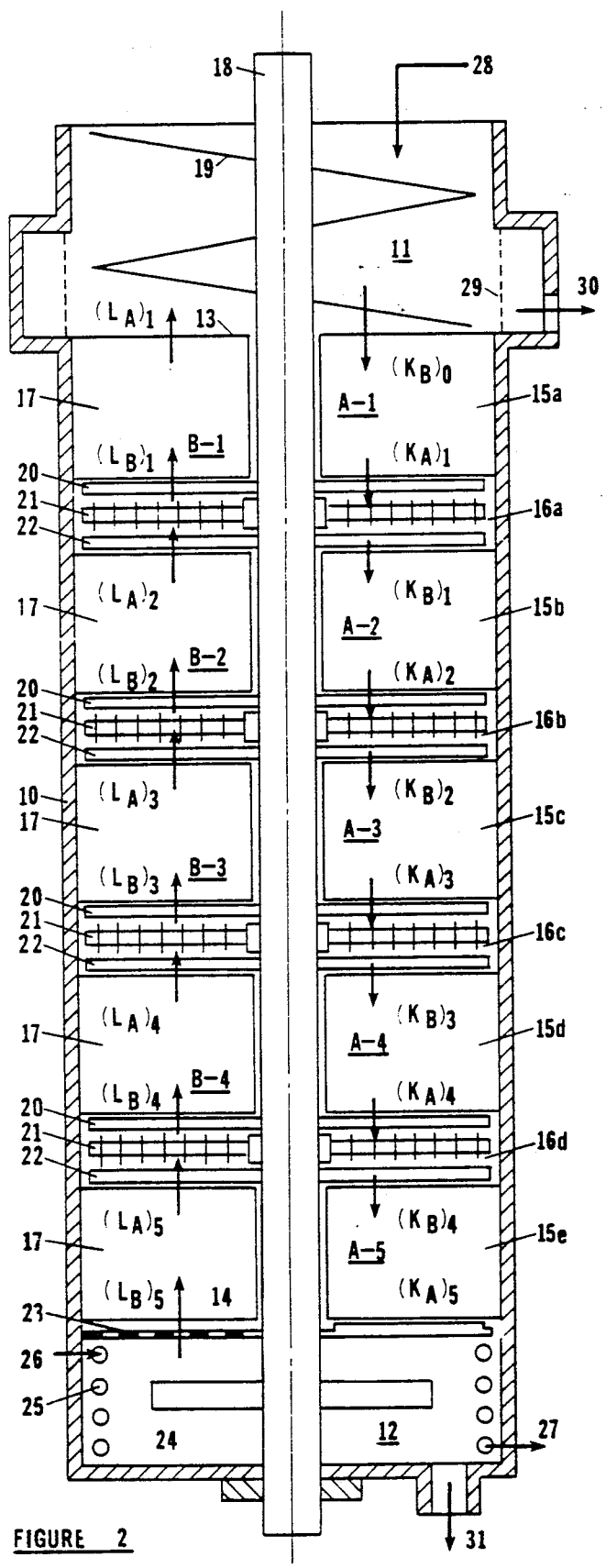
FIGURE 2
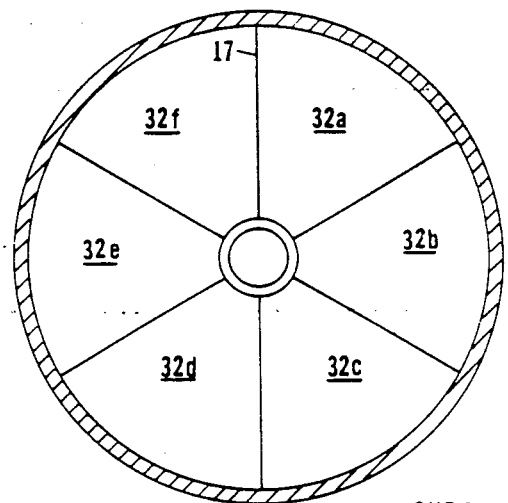
FIGURE 3
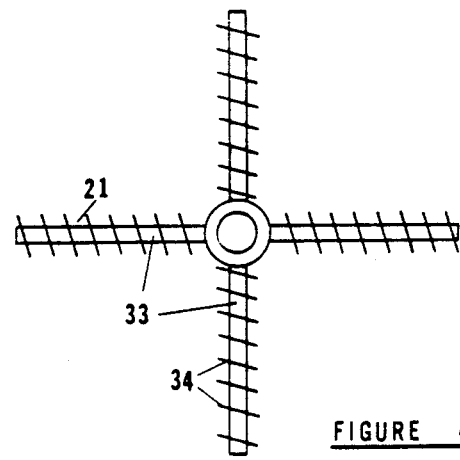
FIGURE 4-a
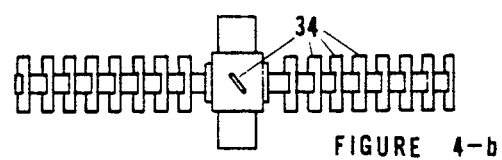
FIGURE 4-b
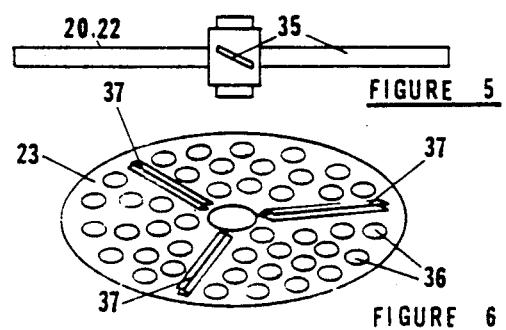
FIGURE 5
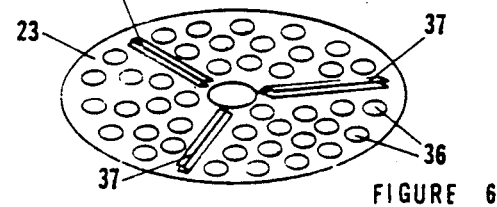
FIGURE 6

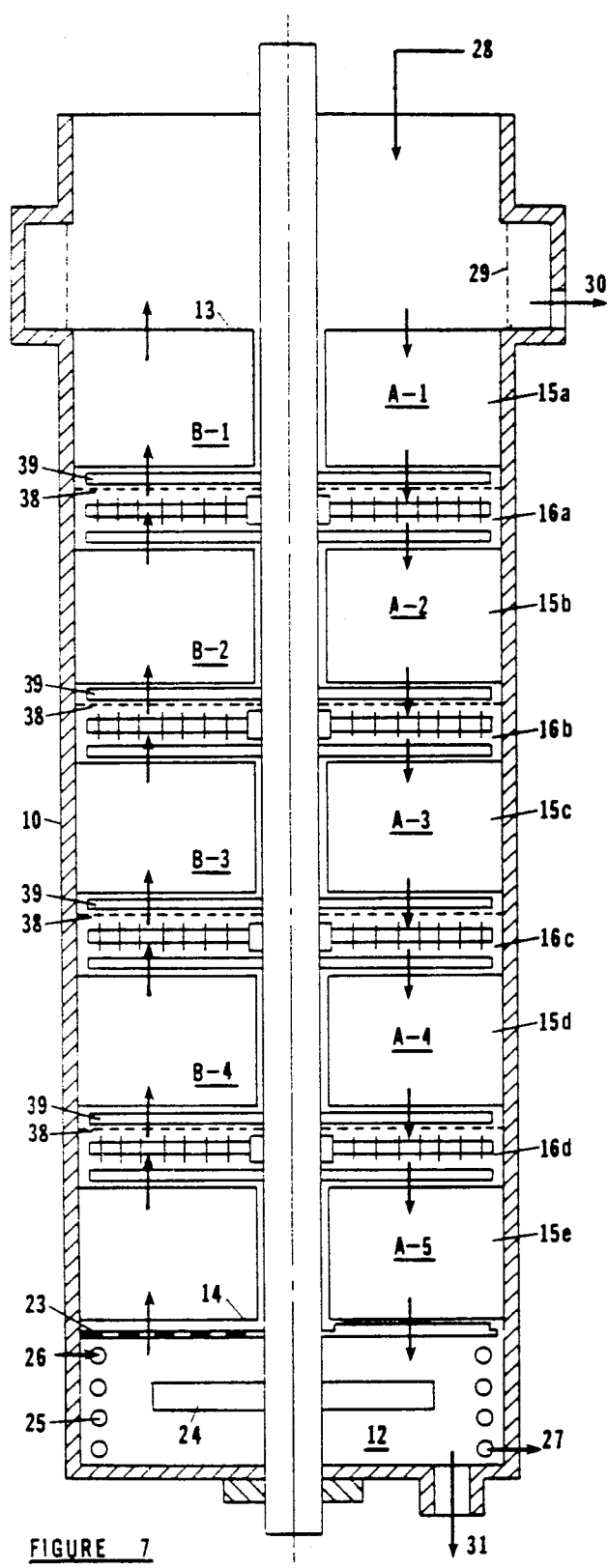
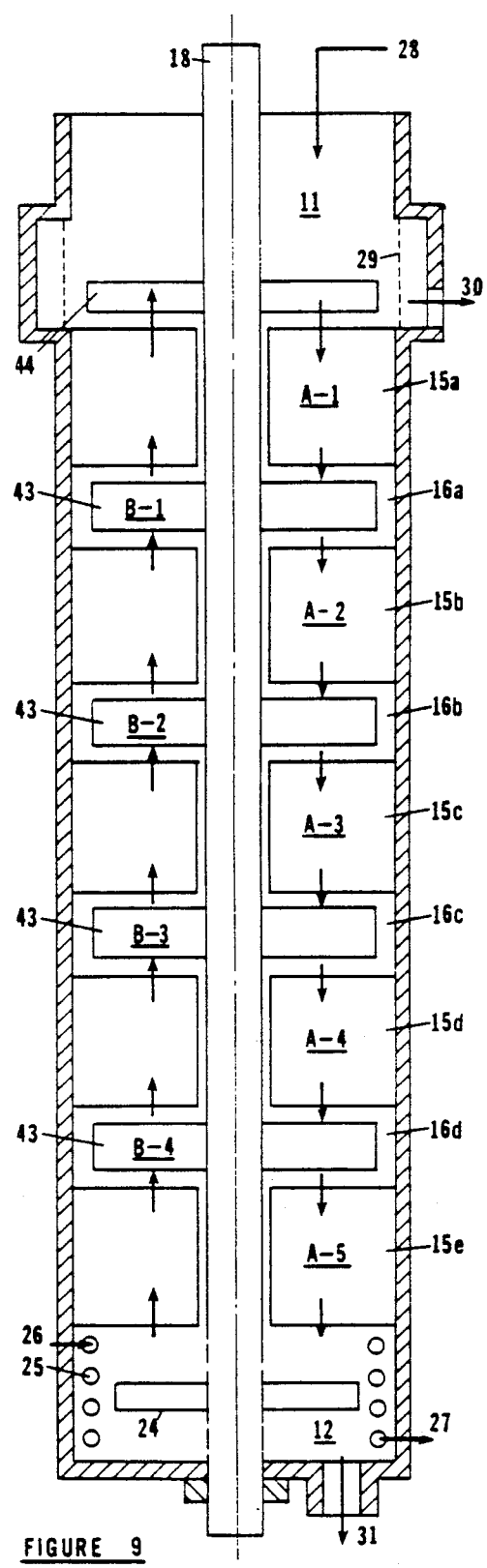

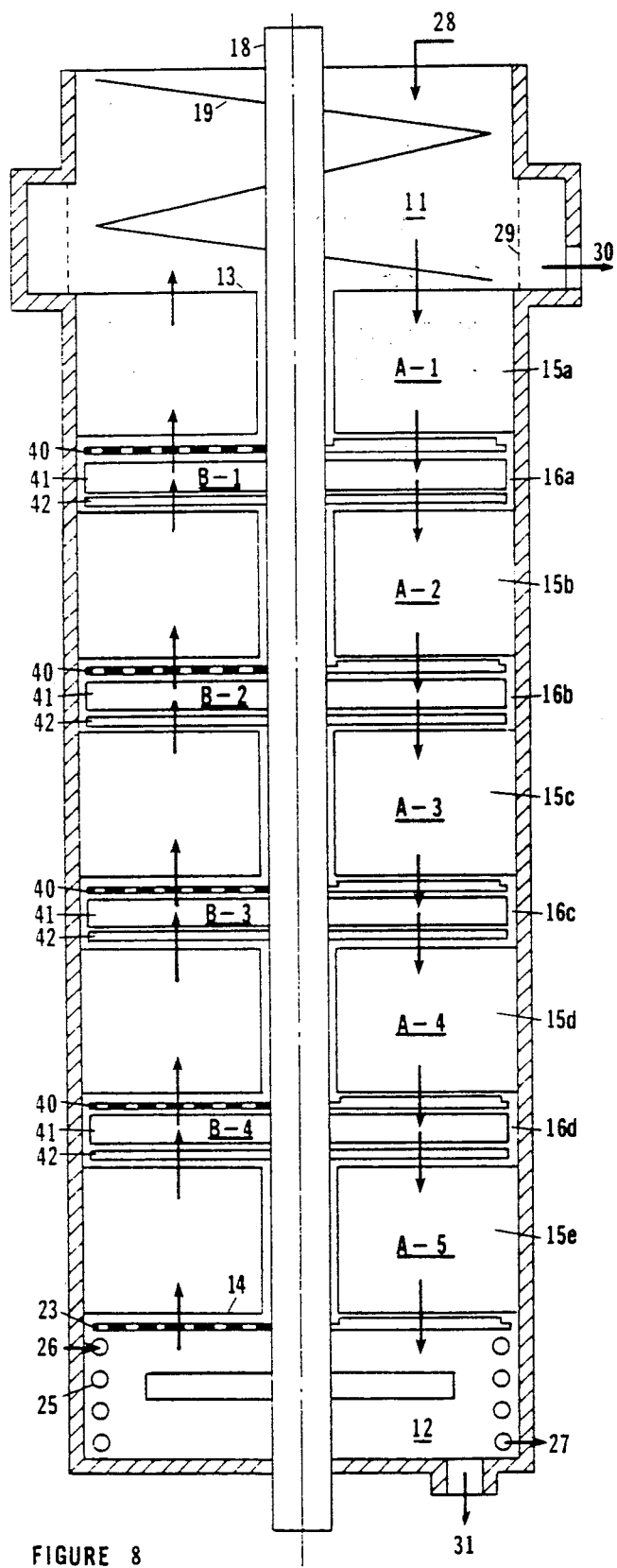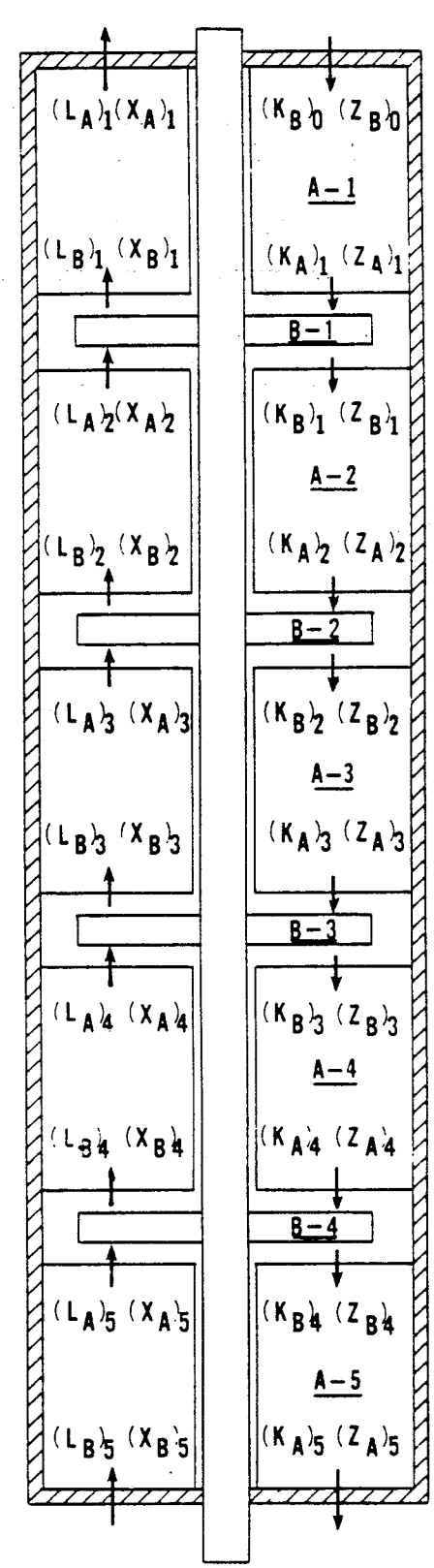
FIGURE 8
FIGURE 10

FRACTIONAL SOLIDIFICATION PROCESS AND APPARATUSES FOR USE THEREIN

BACKGROUND OF THE INVENTION

1. Field of Invention

The present invention introduces a process and apparatuses for washing a mass of crystal-mother liquor mixture to thereby produce highly purified crystals. A highly efficient fractional solidification process is obtained by combining the present crystal washing process with a crystallization operation and a crystal melting operation; an efficient purification system is obtained by combining a crystal washer of the present invention with a freezer and a melter.

2. Brief Description of the Prior Art

In recent years, a considerable number of fractional crystallization techniques have been developed. Those techniques are described in details in the book entitled "Fractional Solidification", edited by M. Zief and W. R. Wilcox and published by Marcel Dekker, Inc., New York in 1967. There is a step of separating crystals from mother liquor and washing the crystals in a fractional solidification process, and the product purity depends on how effectively this step has been conducted.

Differential countercurrent contacting of crystals and liquids is a relatively new and promising method of separating and purifying crystals. Column crystallization, a process based on this method, has the advantage over older processes of crystallization that products of high purity can be produced in a single piece of equipment. Column crystallization processes are described in Chapter 11 of the "Fractional Solidification" book described. These processes are outlined in the following.

Column crystallization was conceived by P. M. Arnold and described in U.S. Pat. No. 2,540,977 (1951). The process is conducted in a system that comprises a freezing section, a purification section and a melting section. The crystals and the adhering liquid are conveyed from the freezing section through the purification section to the melting section, where melt liquid is formed. A fraction of this melt liquid is removed as the high melting product. The remaining fraction is returned to the purification section as a free liquid for differential countercurrent contacting with the crystals. The impurities in the crystals, in the adhering liquid and in the retained liquid are transferred to the free liquid and are removed from the column as constituents of the low melting product. Thus, it is seen that column crystallization is analogous to distillation in a packed tower.

Separations based on crystallization rarely achieve product purities indicated by phase equilbria for a variety of reasons. High impurity levels result because mother liquor is often occluded in crystal imperfections and is entrapped in crystal agglomerates. The crystal is further contaminated by the large amount of mother liquor held in the crystal mass by surface tension and capillary forces. Impurities are also adsorbed on the crystal surface by chemisorption. A further source of impurity in the crystals is the major or minor amount of solid solubility. In describing a differential countercurrent contacting of crystals and liquids, the term "free-liquid" is used to refer to the liquid that will readily drain from or pass through the solid phase, the term "adhering-liquid" is used to refer to the liquid which is adsorbed on or held in the crystals by surface tension and by capillary forces and cannot be readily drained from the crystals, and the term "solid phase" is used to refer to the sum of crystals and the adhering liquid. These terms are also used in this specification with the same meanings.

One of the best examples of the successful commercial application of countercurrent column fractional crystallization is the Phillips process that has been described by D. L. McKay in Chapter 16 of the "Fractional Solidification" book described. The process is based on inventions made by P. M. Arnold (U.S. Pat. Nos. 2,540,999 (1951), 2,540,083 (1951), and U.S. Pat. No. Re. 24,038 (1955)), J. Schmidt (U.S. Pat. No. 2,617,274 (1952) and U.S. Pat. No. Re. 23,810 (1954)), J. A. Weedman (U.S. Pat. No. 2,747,001 (1956)), and R. W. Thomas (U.S. Pat. No. 2,854,494 (1958)). In this process, chilled slurry feed, from a scraped-surface chiller, enters at the top of a purification column. The crystals are forced down by means of a piston and impure liquid is removed through a wall filter. Wash liquor, produced by melting purified crystals at the bottom of the column, is transported upwards counter-currently to the crystals. The wash liquor may be pulsed upwards.

Schildknecht column crystallizer, described in Chapter 11 of the "Fractional Solidification" book described, uses a spiral placed in a column defined by two concentric tubes and is rotated to convey the crystals in the desired direction.

J. W. Mullin has described the TNO process on page 250, Vol. 7 of "Encyclopedia of Chemical Technology", edited by Kirk and Othmer and published by Wiley Co. In this process, separation is effected by countercurrent washing coupled with repeated recrystallization facilitated by impacting the crystals during their transport through a vertical column. Impacting is achieved by balls bouncing on sieve plates in the vertical column.

The Brodie Purifier have been used in commercial operations since 1974 and is available through Nofsinger Corp., in Kansas City, Mo. The Brodie Purifier uses several rotating helical ribbon tubular crystallizers and has a recovery section, a refining section, a purifying section and a crystal melting section. Feedstock enters the plant at the feed inlet point, located between the recovery and refining sections. The internal stream is continuously cooled under controlled conditions as it flows through the tubes of the recovery section. The portion of the feed that has been depleted of product component (and contains all the impurities) leaves the plant as residue. Crystals of product material are produced and settle in their own mother liquor. These crystals are mechanically conveyed towards the refining section, countercurrent to the internal liquid stream, by a low speed helical ribbon. As the crystals are transported through the richer mother liquor, they continue to grow in size and also increase in purity. Reflux is recrystallized in the refining section. After passing through the refining section, the crystals settle by gravity in the purifying section. Here, a heater melts the purified crystals; a portion of the melt is extracted as product, and a portion is refluxed and rises countercurrent to the bed of crystals in the purifying section. Cooling is achieved by means of a closed coolant system, flowing countercurrent to the process liquid. Small heat imputs are made to all unjacketed and unscraped surface to prevent uncontrolled crystallization.

BRIEF DESCRIPTION OF THE INVENTION

The present invention introduces a process for effectively washing a crystal-liquid (mother liquor) mixture with a mass of wash liquid to thereby form a mass of highly purified crystals and also introduces apparatuses for use therein. The apparatuses introduced can be readily scaled up to large purification units and can be constructed at low costs. Super-pure chemicals can thus be produced at low costs by this process. The purification is accomplished by properly conducted alternative stationary and agitated crystal washing operations and substantially countercurrent transfers of the solid phase and the free liquid in a purification zone. The purification zone contains a set of stationary washing sub-zones and a set of agitated washing sub-zones and has a first end and a second end, which are respectively defined as the upstream end and the downstream end relative to the normal direction of the movement of the solid phase. The two sets of sub-zones are laid alternatively along the longitudinal direction of the purification zone from the first end to the second end so that an agitated sub-zone is interposed between two stationary sub-zones. The feed crystal-liquid mixture and the wash liquid are respectively introduced into the purification zone at the first end and the second end. The normal directions of the transfers of the solid phase and the free liquid are respectively from the first end to the second end, denoted as the positive direction, and from the second end to the first end, denoted as the negative direction. Unavoidably, there is some liquid that is transferred with the crystals in the positive direction. Due to these transferr, a mass of crystals and a mass of liquid are placed in each sub-zone.

The mass of crystals in a stationary sub-zone is compacted by a compacting means to form a bed with an enhanced degree of compaction that is substantially higher than the degree of compaction attainable by a natural formation of the bed. A properly enhanced degree of compaction of the bed in a stationary sub-zone is important from the standpoints of an effecient crystal washing and a proper inter sub-zone transfer of the solid phase. The mass of crystals and the mass of liquid in each agitated sub-zone are properly agitated so that the impurities in the mother liquors occluded in the crystal imperfections, entrapped in crystal agglomerates, held in the crystal mass by surface tension, capillary forces and adsorption are released to the free liquid. Recrystallization of crystals also takes place in the sub-zone. An effective local mixing of solid and liquid, rather than a bulk mixing, is important in this agitation operation.

Due to the substantially countercurrent transfers of the solid phase and the free liquid, concentration profiles of the impurities are established both in the free liquid and in the liquid retained by the crystals, the impurity concentrations decreasing from the first end toward the second end. Therefore, a transfer of an impure liquid in this direction reduces the efficiency of the crystal washing operation. Since the solid phase is transferred in this direction, it is important either to reduce the amount of liquid that is transferred with the crystals or counterwash the crystals during an inter sub-zone transfer of the solid phase. Means for accomplishing these functions are incorporated in the apparatuses of this invention. Because of the properly conducted alternative stationary and agitated washing operations and the properly conducted inter sub-zone transfers of the solid phases and the free liquids, the impurity concentrations of the liquids retained in the solid phases transferred between sub-zones decrease sequentially, nearly following a geometric sequence rather than approaching a limiting valve. Thus, a mass of highly purified crystals can be obtained from the second end of the purification zone. It is noted, in contrast, that the purity of the crystals harvested in a conventional column crystallizer tends to approach a limit as the length of the purification section is increased.

An efficient fractional solidification process is obtained by combining the crystal purification process described with crystallization and melting operations; an efficient separation and purification system is obtained by combining a crystal purification column described with a crystallizer and a melter.

BRIEF DESCRIPTION OF THE DRAWINGS

FIG. 2 illustrates a base crystal purification unit having a crystal feeding zone, a crystal purification zone and a crystal melting zone. The purification zone contains a set of stationary washing sub-zones (five are shown) and a set of agitated washing sub-zones (four are shown), which are laid alternatively so that an agitated sub-zone is connected to two stationary sub-zones.

FIG. 3 illustrates a cross-section taken at a stationary sub-zone. It is seen that baffles are provided in the sub-zone to help maintaining a compacted bed and preventing the bed from being agitated by the agitators in the neighboring sub-zones.

FIGS. 4-a and 4-b illustrate an agitator used to promote local mixing of solid and liquid in an agitated sub-zone.

FIG. 5 illustrates a rotary unit with tilted blades used for compacting the bed in a stationary sub-zone.

FIG. 6 illustrates a rotating perforated disk with shaving knives that may be used to support the bed in a stationary sub-zone and transfer the solid phase from the sub-zone.

FIG. 7 illustrates a first modified crystal purification unit, in which a stationary perforated plate is used to separate a stationary sub-zone from its next following agitated sub-zone and a rotating blade is used to transfer the solid phase across the perforated plate.

FIG. 8 illustrates a second modified crystal purification unit, in which a rotary perforated disk with shaving knives is used to separate a stationary sub-zone from its next following agitated sub-zone. The bed in the stationary sub-zone is supported by the rotating perforated disk and is compacted by a rotating blade; the inter sub-zone transfer of the solid phase is accomplished by the shaving action of the knives provided on the rotary disk.

FIG. 9 illustrates a third modified crystal purification unit. This unit is a very simple unit: there is no perforated disk to separate the sub-zones, there is no rotary unit with blades to compact the bed in a stationary sub-zone and there is no rotary shaving knives for inter sub-zone transfer of the solid phase. There is only one compacting means at the top of the column. In this system, the crystals in all sub-zones including the agitated sub-zones form a continuous bridged structure through which force can be transmitted. Therefore, the downward force applied by the compacting means at the top of the purification zone and the entire weight of the solid bed above a given level are applied to the bed at the level through the bridged structure and thereby compact the bed thereat.

Notations used in an analysis of the performance of a purification column are summarized in FIG. 10. As shown in FIG. 1, these notations are also used in presenting the results of such an analysis.

DESCRIPTION OF PREFERRED EMBODIMENT OF THE INVENTION

I. Introduction

Figure 1:
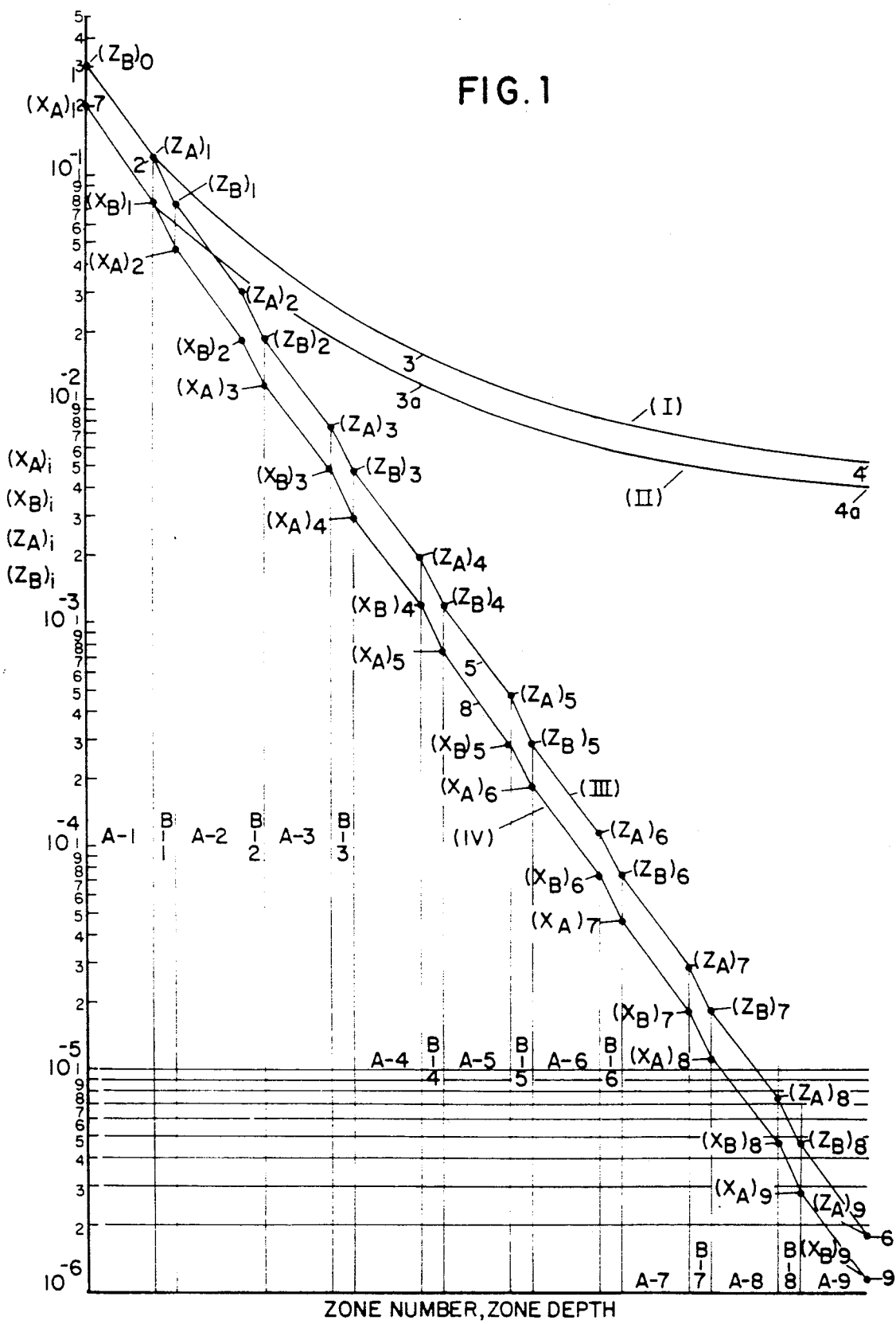
FIG. 1 compares the performances of crystal washing operations conducted in a conventional column crystallizer and in a crystal purification column of the present invention. The first line and the second line respectively illustrate the concentration profiles of the impurities in the retained liquid and in the free liquid in a conventional column crystallizer as functions of the depth of the purification section. They show that the impurity concentrations of the liquids tend to approach limiting values. Therefore, the purity of the harvested crystals also tend to approach a limiting value. The third and fourth line respectively illustrate similar concentration profiles in a purification column of the present invention as functions of the zone number. They show that the impurity concentrations in the liquids at corresponding points in the sub-zones sequentially decrease, nearly following a geometric sequence. Therefore, a mass of highly purified crystals can be harvested from this purification column.

In order to properly describe the condition of the bed formed in a stationary sub-zone in a purification column of the present invention, it is important to review the mechanisms by which a bed is formed from a suspension and it is convenient to define the following terms: "naturally formed bed" or "naturally compacted bed", "naturally sedimented bed", "natural degree of compaction" or simply "natural compaction", "compaction enhanced bed", and "enhanced degree of compaction" or simply "enhanced compaction".

Subjects related to the mechanisms by which a sedimented bed is formed from a suspension are described in books on unit operations of chemical engineering and on mineral dressing. Subjects of interest include free settling, hindered settling, classification, sedimentation and sedimentation volume, formation of a self-supported bridged structure of particles, jigging and consolidation trickling, and bed expansion prior to the onset of a fluidized bed. For example, these subjects are described in Chapters 7, 8, 10 and 20 of "Unit Operations" co-authored by G. G. Brown et al and published by John Wiley and Sons, Inc. in 1950.

When a suspension is allowed to settle in a tank batchwise, particles of different sizes do not settle the same distance during a given settling period. A particle may settle for a period of time before it is supported by bridging with other particle. A coarse particle comes to rest earlier than a small particle does. A small particle may settle part of the time on top of the bed of coarse material and part of the time through the interstices between large particles. This action, called consolidation trickling, represents the settling of fine particles, whereas coarse particles are self-supported and do not settle. The settling of fine particles is much slower during consolidation than during suspension, but the effect may be important in determining the degree of compaction of the resulting bed. Finally, all particles, coarse and fine, come to rest and a self-supported bridged structure of particles is formed. The degree of compaction of the bed obtained may be measured by the porosity of the bed: the lower is the porosity of the bed, the higher is the degree of compaction. Degree of compaction of a bed may also be measured by the permeability of the bed: the lower is the permeability of the bed, the higher is the degree of compaction. Increasing the static pressure applied to a naturally formed bed does not substantially affect the degree of compaction, because forces applied to various parts of the outer surface of a particle balance out. However, forces transmitted through the self-supported structure of the bed can cause the structure to collapse and cause the bed to assume a more consolidated structure and thereby raise the degree of compaction. A bed formed from a suspension by sedimention without application of an external force other than the gravity forces on the particles, is referred to by the following equivalent terms: "naturally formed bed", "naturally compacted bed", and "naturally sedimented bed". The degree of compaction of the bed is referred to equivalently by "natural degree of compaction" and "natural compaction". Within a thick naturally formed bed, the degree of compaction at a low level may be substantially higher than that at a high level because the weight of the bed transmitted through the structure of the bed does compact the bed at the low level. Therefore, the average degree of compaction of a naturally formed bed is a function of the depth of the bed.

In a purification column of the present invention, there are a set of stationary washing sub-zones and a set of agitated washing sub-zones laid alternatively. The degree of compaction in each stationary sub-zone is an important factor affecting both the effectiveness of crystal washing and the amount of liquid carry over in the inter sub-zone transfer of the solid phase. In order to properly characterize the bed in a stationary washing sub-zone, it is convenient to refer to a reference bed. The degree of compaction of an actual bed can then be compared with the degree of compaction in the reference bed. The reference bed used in this specification is a "steady state naturally formed bed", which may be simply referred also as a "naturally formed bed". This reference bed is defined in the following paragraph.

When a stationary washing sub-zone is connected at the first end to an up-stream agitated sub-zone by a perforated plate and is also connected at the second end to a downstream agitated sub-zone by another perforated plate and then a solid phase is introduced into the sub-zone at the first end and a solid phase is removed from the sub-zone at the second end, and a free liquid is introduced to the sub-zone at the second end and another free liquid is removed from the sub-zone at the first end, so that a steady state is attained in the sub-zone, the bed so formed in the sub-zone is referred to as "steady state naturally formed bed" or simply as "naturally formed bed". There is no force applied to the self-supported structure of the crystals of the bed formed in the sub-zone other than the frictional drag of the moving fluid and gravity forces applied to the bed. The degree of compaction of this steady state bed may be somewhat different from that of the bed formed in a tank described, because of the drag caused by the flow of liquid through the bed. But the difference is limited.

These are two ways by which the degree of compaction of the bed formed in a stationary washing sub-zone can be increased or enhanced substantially beyond the natural degree of compaction. As has been described, a bed can be compacted by transmitting force through the self-supported structure of the solid particles in the bed. One way to compact the bed is to have a mechanical means of applying force to the structure of the bed. Mechanical means such as a piston, a screw conveyor, and a rotating unit with tilted blades may be used to compact the bed. The other way is to transmit the weight of the beds in those sub-zones, including both stationary and agitated, above a given sub-zone through the structure of the bed in the sub-zone to thereby compact the bed at the given sub-zone. In order to transmit the weight of the beds in the higher sub-zones to the structure of the bed in the given sub-zone, no perforated plate be used in separating the sub-zone from its upstream agitated sub-zone and the structures of the beds in the higher sub-zones should be such that the weight of the beds in the sub-zones can be transmitted through the beds. A bed whose degree of compaction is substantially higher than that of the corresponding naturally formed bed is referred to as a "compaction enhanced bed", and the bed is said to have an "enhanced degree of compaction", or an "enhanced compaction".

II. Comparisions of the Performances of a Conventional Column Crystallizer and a Purification Column of the Present Invention A method of analyzing the performance of a purification column of the present invention is presented in section IV and the results obtained are presented and compared with the performance of a conventional column crystallizer in FIG. 1.

One of the best examples of the successful commercial application of countercurrent column fractional crystallization is the Phillips process described. The column used contains a crystal forming zone, a deep non-agitated crystal purification zone and crystal melting zone. Crystals are formed by a scraped-surface chiller. In operation, chilled slurry is formed in the chiller and becomes a feed that is fed to the top of the purification column. The crystals are forced down by means of a piston and impure liquid is removed through a wall filter. Wash liquor, produced by melting purified crystals at the column, is transported upward to cause free liquid to move upward counter-currently to the movement of the solid phase containing the moving crystals. The bed in the purification zone is not agitated. Because of the countercurrent transfers of the solid phase and the free liquid, impurity concentration profiles are established in the purification zone. Line I, 1-2-3-4, in FIG. 1 illustrates how the impurity concentration in the retained liquid varies with the depth of the column; line II, 7-3a-4a, illustrates how the impurity concentration in the free liquid varies with the depth of the column. It is shown that both of these lines approach some limiting values. Since the solid phase discharged from the bottom of the column is melted to become the purified product and since the solid phase contains the retained liquid, the impurities in the retained liquid become the impurities in the purified product. Therefore, the purity attainable in a conventional column crystallizer has a practical limit. Therefore, it seems that adding depth to a column crystallizer has diminishing return in its performance. The major reasons are that the bed formed in the column is not agitated and simply descends through the column, impurities retained within crystal agglomerates are not quickly released to the free liquid, and a chanelling pass formed tends to stay as a chanelling pass.

Line III, 1-2-5-6, and line IV, 7-8-9, respectively illustrate the impurity concentration profiles established in the retained liquids and free liquids in a purification column of the present invention. The column contains nine stationary washing sub-zones, denoted as A-1, A-2, ..., A-8 and A-9 sub-zones, and eight agitated washing sub-zones, denoted as B-1, B-2, ..., B-7, and B-8 sub-zones. $(Z_B)_o$ and $(X_B)_9$ respectively represent the impurity concentrations in the retained liquid of the solid-liquid feed and in the wash liquid; $(Z_A)_i$ and $(Z_B)_i$ respectively represent the impurity concentrations in the retained liquids of the solid phases transferred at the lower ends of A-i and B-i sub-zones; $(X_A)_i$ and $(X_B)_i$ respectively represent the impurity concentrations in the free liquids transferred at the upper ends of A-i and B-i sub-zones. It is illustrated in the figure that the impurity concentrations in liquids at corresponding positions in these sub-zones form sequences that are nearly geometric sequences. Thus, $[(Z_B)_o, (Z_B)_1, \ldots, (Z_B)_8$ and $(Z_B)_9]$, $[(Z_A)_1, (Z_A)_2, \ldots, (Z_A)_8, (Z_A)_9]$, $[(X_B)_1, (X_B)_2, \ldots, (X_B)_8, (X_B)_9]$, $[(X_A)_1, (X_A)_2, \ldots, (X_A)_8, (X_A)_9]$ form four sets of sequences. It is important to note that the impurity concentrations in the liquids in each set successively diminish without approaching a limiting value. Therefore, by having a proper number of sub-zones, the impurity level can be reduced to a very very low level, say in the part per million to part per billion or to even lower level.

It will be shown that the depth of each sub-zone is rather short: the depth of a stationary sub-zone may be from a few inches to 2 or 3 feet, and the depth of an agitated sub-zone may be shorter. Therefore, a high performance column that produces super-pure chemicals may be a relatively short column. Furthermore, it will be shown that a relatively mild agitation enhancing local mixing may be used in an agitated sub-zone. To summarize, in a purification column of the present invention, alternative stationary washing and agitated washing operations and inter sub-zone transfers of the solid phases and the free liquids are properly conducted so that the bed moving through the column refreshes itself, keeping up the performance of the column.

III. Process and Apparatuses

FIG. 2 illustrates a base crystal purification unit having a crystal feeding zone, a crystal purification zone and a crystal melting zone. The unit comprises a vertical vessel 10 that contains the crystal feeding zone 11, the crystal melting zone 12 and the crystal purification zone bounded between the first end 13 and the second end 14. The purification zone contains a set of stationary washing sub-zones, 15a through 15e, denoted respectively as sub-zones A-1 through A-5, and a set of agitated washing sub-zones, 16a through 16d, denoted respectively as sub-zones B-1 through B-5. In each stationary sub-zone, there are radial and vertical baffles 17 dividing the sub-zone into compartments. There is a central shaft 18, a crystal feeding means 19, a first set of solid phase transfer means 20, a set of agitating means 21, a second set of solid phase transfer means 22, a solid phase discharging means 23 and another agitating means 24 for agitating crystals in the melter. It is seen that all the feeding, agitating and transfer means are attached to the central shaft and are rotated by it. A heating coil 25 provided with a heating medium inlet 23 and a medium outlet 27 is installed in the crystal melting zone.

A crystal-liquid feed 28 is introduced at the top of the column; a purified product 31 is discharged from the crystal melting zone; an impure liquid is filtered through a wall filter 29 and removed as the residue 30. The bed descends successively through the stationary and agitated sub-zones and free liquids flow upwards through the sub-zones. The solid phases entering A-1 through A-5 stationary sub-zones are respectively denoted as $(K_B)_0$ through $(K_B)_4$ streams; the solid phases leaving A-1 through A-5 stationary sub-zones are respectively denoted as $(K_A)_1$ through $(K_A)_5$ streams; the free liquids entering A-5 through A-1 stationary sub-zones are respectively denoted as $(L_B)_5$ through $(L_B)_1$ streams; the free liquids leaving A-5 through A-1 stationary sub-zones are respectively denoted as $(L_A)_5$ through $(L_A)_1$ streams. The solid phase that enters the crystal melting zone is melted: a part of the melt becomes the purified product 31 and the rest becomes the wash liquid, $(L_B)_5$.

For an effective crystal washing operation in a stationary sub-zone, the bed in the sub-zone needs to be compacted to a degree that is substantially higher than the natural degree of compaction. This is accomplished by activating the solid feeding means 19, and solid-phase transfer means 22. Therefore, these solid-phase transfer means are also used as bed compacting means.

Since the impurity concentration decreases in the downward direction, transfer of an impure liquid in this direction impairs the performance of the column. Unavoidably, the liquid retained in the solid phase transferred between sub-zones does move in this unfavorable direction. The unfavorable effect caused by the movement of the retained liquid can be reduced by either one or both of the following ways:

(i) reduce the amount of retained liquid in the inter sub-zone transfer solid phase;

(ii) counter wash the solid phase while it is transferred between two sub-zones.

The first way is used in the column illustrated. The amounts of liquid in the solid phases transferred from the stationary sub-zone to the agitated sub-zones, viz. $(K_A)_1$, $(K_A)_2$, $(K_A)_3$, and $(K_A)_4$ streams, are maintained at low values by compacting the beds in the stationary sub-zones and by shaving the bottoms of the beds as the beds stick out of the bottom edges of the sub-zones by the rotating blades provided on the transfer means 20. The amounts of liquid in the solid phases transferred from the agitated sub-zones to the stationary sub-zones, viz. $(K_B)_1$, $(K_B)_2$, $(K_B)_3$, and $(K_B)_4$ streams, are maintained at low values by the compacting actions provided by tilted blades provided on the transfer means 22 used in the solid phase transfers. The rotated tilted blades on a transfer means serve to compact the bed below and reduce the amount of liquid transferred to the bed below.

It has been described that separations based on a conventional crystallization rarely achieve product purities indicated by phase equilibria for a variety of reasons. High impurity levels results because mother liquor is often occluded in crystal imperfections and is entrapped in crystal agglomerates. The crystal mass is further contaminated by the large amount of mother liquor held in the crystal mass by surface tension and capillary forces. Impurities are also adsorbed on the crystal surface. A further source of impurity in the crystals is the major or minor amount of solid solubility. In the present process, the crystal-liquid mass in an agitated sub-zone is properly agitated so that the impurities retained in the crystal mass can be released to the free liquid and crystals may be recrystallized. The crystal mass in an agitated sub-zone thereby becomes a reconditioned crystal mass. It is from this reconditioned crystal mass that a fresh crystal bed is formed in the following stationary sub-bed.

FIG. 3 illustrates a cross section taken at a stationary sub-zone. It is seen that there are vertical and radial walls 17 separating the sub-zone into compartments 32a through 32f, in which crystal beds are formed and descend through. The walls are provided to help maining a compacted bed and preventing the bed from being agitated by the agitators in the neighboring sub-zones.

FIGS. 4-a and 4-b illustrate one type of agitator that can be used in an agitated sub-zone to promote local mixing of the crystal-liquid mass to thereby break up crystal agglomerates, mix crystals and the free liquid to thereby release the impurities from the crystal mass into the free liquid and help recrystallize the crystals. It is noted that local mixing of the crystal mass and free liquid is important in this operation. The agitator 21 shown has radial arms 33 and blades 34 that are tilted with respect to the direction of its movement. The agitator is rotated so that the motion is substantially coplanar. There are four arms shown. The blades on the first and third arms are tilted in one direction and the blades on the second and fourth arms are tilted in the opposite direction. As the crystal bed descends through the agitated sub-zone, the crystals are moved alternatively inward and outward and are mixed intimately with the upward moving free liquid. It is noted that the motion of a crystal mass in the sub-zone is substantially coplanar, even though there is some downward component to follow the descent of the bed.

FIG. 5 illustrates the structures of the solid phase transfer means 20, 22 shown in FIG. 2. A transfer means has blades 35 tilted in the downward direction. The first transfer means 20 at the bottom of a stationary sub-zone shaves a mass of solid bed that sticks out of the sub-zone and thereby transfers it to the next agitated sub-zone. The second transfer means 22 at the bottom of an agitated sub-zone takes in a mass of crystal-liquid mass from the sub-zone, compacts it to release a major fraction of the liquid and transfer the compacted mass of crystals to the next stationary sub-zone. The second transfer means also serves to compact the bed in the next stationary sub-zone.

FIG. 6 illustrates a rotating disk 23 with perforations 36 provided with shaving knives 37. Such a rotating perforated disk may be used simultaneously to support the bed in a stationary sub-zone and to transfer the solid phase from the sub-zone. It can therefore be used in the place of a first solid transfer means 20 in FIG. 2. In FIG. 2, the rotating perforated disk 23 is shown as a solid transfer means transferring the solid phase from the last stationary sub-zone into the crystal melting zone.

FIG. 7 illustrates a first modified crystal purification unit. The unit is similar to that of FIG. 2 and has the following modifications: (1) a stationary perforated plate 38 is used to separate a stationary sub-zone from its next following agitated sub-zone and support the bed, and (2) a rotating blade 39 similar to that of FIG. 5 is used to transfer solid phase across the perforated disk and into the next agitating sub-zone.

FIG. 8 illustrates a second modified crystal purification unit. This unit is also similar to that of FIG. 2 and has the following modification: a rotary perforated plate provided with shaving knives 40 similar to that illustrated by FIG. 6 is used to separate a stationary sub-zone from its next following agitated sub-zone. The bed in the stationary sub-zone is supported by the rotating perforated disk 40 and is compacted by a rotating blade 40 that is illustrated by FIG. 5. The crystal-liquid mass in an agitated sub-zone is agitated by an agitator 41.

FIG. 9 illustrates a third modified crystal purification unit. This unit is also similar to that of FIG. 2 and has the following features: (1) there is no perforated plate, rotary or non-rotary, to separate a stationary sub-zone from its neighboring agitated sub-zone, (2) no rotary blade is used to compact the bed in a stationary sub-zone, and (3) there is no rotary shaving knives for inter sub-zone transfer of the solid phase. An agitator 43 is used to agitate an agitated sub-zone. There is only one bed compacting means 44 at the top of the column. In this unit, the crystals in all sub-zones including the agitated sub-zones form a continuous bridged structure through which force for compacting the bed can be transmitted. Therefore, the downward force applied by the compacting means at the top of the purification zone and the entire weight of the solid bed above a given level are applied to the bed at the level through the bridged structure and thereby compact the bed thereat. The agitator may also be provided with tilted blades to compact the bed further.

An analysis of the performance of a purification column will be presented in section IV and some results obtained have been presented in section I. The notations used in this analysis are summerized in FIG. 10. The solid phases introduced in the stationary sub-zones A-1 through A-N are respectively denoted as $(K_B)_o$, $(K_B)_1$, ..., $(K_B)_{N-2}$, and $(K_B)_{N-1}$ and the impurity concentrations in the retained liquids in these streams are respectively denoted as $(Z_B)_o$, $(Z_B)_1$, ..., $(Z_B)_{N-2}$, and $(Z_B)_{N-1}$; the solid phases transferred out of the stationary sub-zones A-1 through A-N are respectively denoted as $(K_A)_1$, $(K_A)_2$, ..., $(K_A)_{N-1}$, and $(K_A)_N$ and the impurity concentrations in the retained liquids of these streams are respectively denoted $(Z_A)_1$, $(Z_A)_2$, ..., $(Z_A)_{N-1}$ and $(Z_A)_N$; the free liquids entering the stationary sub-zones A-N through A-1 are respectively denoted by $(L_B)_N$ through $(L_B)_1$ and the impurity concentrations in these streams are respectively denoted $(X_B)_N$ through $(X_B)_1$; the free liquids leaving the stationary sub-zones A-N through A-1 are respectively denoted $(L_A)_N$ through $(L_A)_1$ and the impurity concentrations in these streams are respectively denoted $(X_A)_N$ through $(X_A)_1$.

Figure 11:
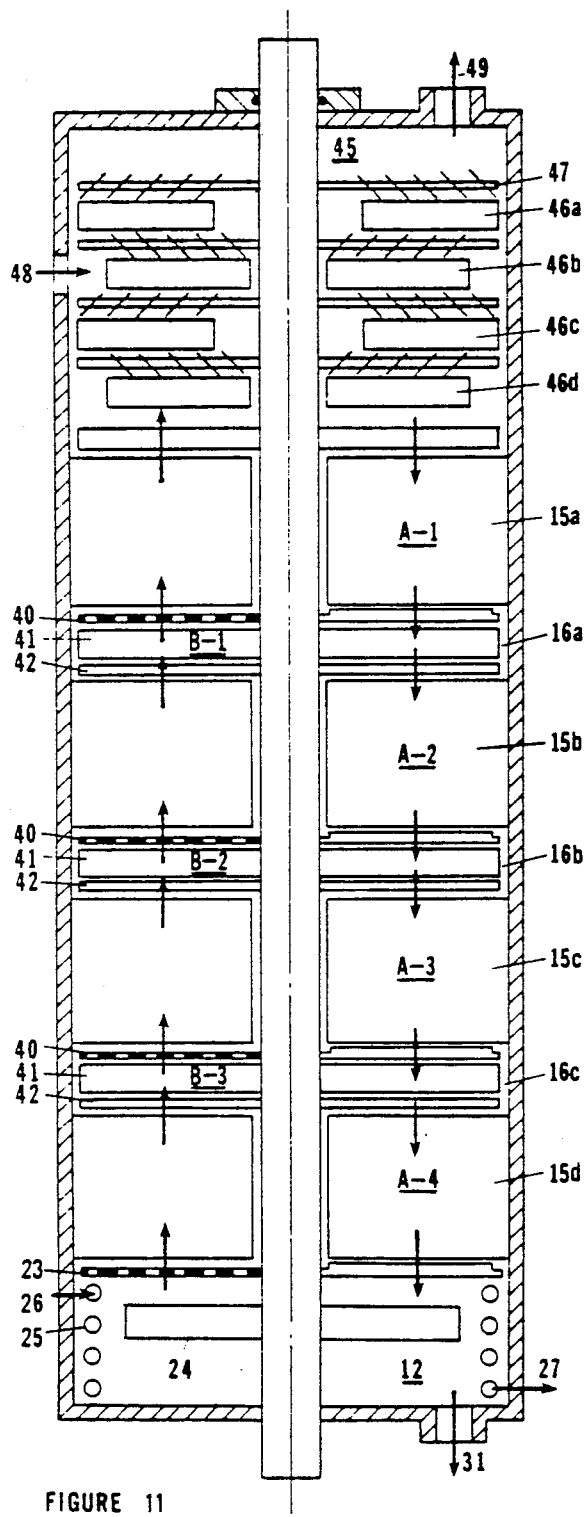
FIG. 11 illustrates a complete purification system having a crystal forming zone, a crystal purification zone and a crystal melting zone. It is shown that there is a crystallizer made of a scraped surface tiered thin plate heat exchanger in the crystal forming zone. This is new heat exchanger coinvented by the present applicants and is described in the specification of Ser. No. 06/543,462 application filed on Oct. 19, 1983. It is shown that a liquid feed may be introduced at an intermediate position in the crystal forming zone.
Figure 12:
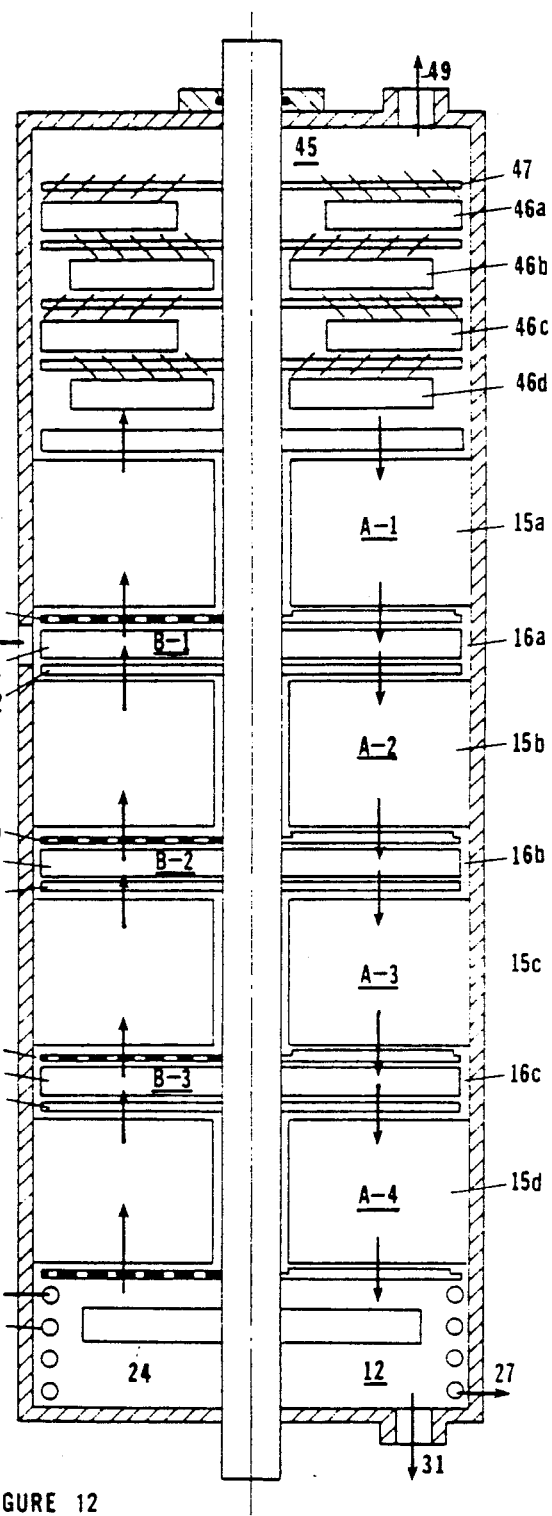
FIG. 12 illustrates another complete purification system that is similar to that of FIG. 11. In this system, it is shown that a liquid feed may be introduced at an intermediate position in the purification zone.

FIG. 11 illustrates a complete purification system having a crystal forming zone 45, a crystal purification zone and a crystal melting zone. The crystal purification zone and crystal melting zone are similar to those described. It is shown that there is a crystallizer made of a scraped surface tiered thin plate heat exchanger in the crystal forming zone. This crystallizer comprises thin plate heat exchangers 46a through 46d and scrapers 47 scraping the exchanger surfaces. This crystallizer has been co-invented by the present applicants and is described in the specification of Ser. No. 06/543,462 application filed on Oct. 19, 1983. It is shown that a liquid feed 48 may be introduced at an intermediate position in the crystal forming zone. The crystal-liquid mixture formed in the crystallizer becomes the feed to the purification zone. FIG. 12 illustrates another complete purification system that is similar to that of FIG. 11. In this system, it is shown that a liquid feed 50 may be introduced at an intermediate position in the purification zone.

IV. Performance Analysis

In this section, the performance of a purification column of the present invention is analyzed. The assumption made and the equations to be used in the analysis are presented in the first part and the procedures used in an analysis and conclusions derived from the analysis are presented in the second part. The notations summarized in FIG. 10 are used in this analysis.

IV-1. Assumptions Made in the Analysis and Derivations of the Equations Used in the Analysis The solid phase leaving each sub-zone consists of a mass of crystals and a mass of the retained liquid. Therefore, one obtains $$(K_A)_i = (S_A)_i + (M_A)_i \quad (1)$$

and $$(K_B)_i = (S_B)_i + (M_B)_i \quad (2)$$

where $(S_A)_i$ and $(S_B)_i$ are masses of crystals in $(K_A)_i$ and $(K_B)_i$ respectively and $(M_A)_i$ and $(M_B)_i$ are masses of retained liquids in $(K_A)_i$ and $(K_B)_i$ respectively.

Around the boundary surrounding the A-i sub-zone, a solid phase $(K_B)_{i-1}$ enters and a solid phase $(K_A)_i$ leaves, and a free liquid $(L_B)_i$ enters and a free liquid $(L_A)_i$ leaves. The impurity concentration $(Z_A)_i$ in the retained liquid of the solid phase leaving the sub-zone is in-between that of the retained liquid in the incoming solid phase and that of the incoming free liquid. Therefore, these impurity concentrations are related by the following equations:

$$(Z_A)_i = \alpha(X_B)_i + (1-\alpha)\cdot(Z_B)_{i-1} \quad (3)$$

The $\alpha$-value in the equation is a measure of the effectiveness of the crystal washing operation. When $\alpha=1$, the washing operation is a perfect washing operation having an ideal plug flow displacement of all the retained liquid by the wash liquid. As the effectiveness of washing decreases, the $\alpha$-value decreases. With a properly conducted deep wash column, $\alpha$-value may be higher than 0.9. $\alpha$-value in excess of 0.75 can be readily obtained in a rather short but properly compacted bed. In a purification column of the present invention, a plurality of short stationary washing sub-zones are used. The $\alpha$-value obtainable in such a short sub-zone is lower than that obtainable in a deep column. This analysis will show that a high purity product can be obtained by the present process using short but properly compaction enhanced beds in the stationary washing sub-zones.

Total material balance around the A-i stationary sub-zone gives $$(L_B)_i + (K_B)_{i-1} = (L_A)_i + (K_A)_i \quad (4)$$

By substituting equations (1) and (2) into equation (4), one obtains $$(L_B)_i + (S_B)_{i-1} + (M_B)_{i-1} = (L_A)_i + (S_A)_i + (M_A)_i \quad (5)$$

By assuming $(S_B)_{i-1} = (S_A)_i$, this equation becomes $$(L_B)_i + (M_B)_{i-1} = (L_A)_i + (M_A)_i \quad (6)$$

For simplicity, one may assume that $$(L_B)_i = (L_A)_i = L \quad (7)$$

$$(M_B)_{i-1} = (M_A)_i = M \quad (8)$$

The impurity balance around the same sub-zone gives $$(L_B)_i(X_B)_i + (M_B)_{i-1}(Z_B)_{i-1} = (L_A)_i(X_A)_i + (M_A)_i(Z_A)_i \quad (9)$$

Then, by substituting equations (3), (7) and (8) into equation (9), one obtains the following equation for $(X_B)_i$:

$$(X_B)_i = \frac{(X_A)_i - \alpha \cdot (M/L)(Z_B)_{i-1}}{1 - \alpha \cdot (M/L)} \quad (10)$$

One may assume that an agitated washing sub-zone performs is an ideal back-mix reactor and assume that $$(Z_B)_i = (X_B)_i \quad (11)$$

Then, by taking impurity balance around B-i sub-zone, one obtains $$(X_A)_{i+i} = (1 + M/L)(X_B)_i - (M/L)(Z_A)_i \quad (12)$$

The impurity balance around the entire purification zone gives the following relation:

$$(M_B)_o \cdot (Z_B)_o + (L_B)_N \cdot (X_B)_N = (M_A)_N(Z_A)_N + (L_A)_1(X_A)_1 \quad (13)$$

In a high overall performance column, the second and third term can be neglected. Therefore, one obtains $$(X_A)_1 = \frac{M(Z_B)_o}{L} \quad (14)$$

IV-2. Procedures Used in a Performance Analysis and Conclusions Derived from the Analysis Equations 14, 10, 3, 11, and 12 that are developed in the last section are used in making a performance analysis of a purification zone containing alternative stationary and agitated washing sub-zones. There are two parameters that appear in the equations that characterize each operation in a purification column. These are $\alpha$-value and (L/M)-value.

Each crystal washing operation in a stationary sub-zone is characterized by its $\alpha$-value. With a properly compacted deep stationary sub-zone, $\alpha$-value may exceed 0.9. With a properaly compacted short sub-zone, value may range from 0.6 to 0.9, depending on the depth and degree of compaction. $\alpha$-value of 0.75 is used in the example to be presented.

(L/M)-value is related to the M/S ratio in the solid phase transferred between sub-zones and to the recycle ratio, defined as ratio of the amount of wash liquid used to the amount of purified product. The solid phase transferred between two sub-zones, contains a mass of crystals, S, and a mass of retained liquid, M. As has been described, it is important to reduce the amount of retained liquid in the solid phase transferred between sub-zones. Therefore, it is important to have a proper way of transferring solid phase between sub-zones such that M/S ratio is kept low. In the example to be presented, M/S=0.345 is used. The solid phase $(K_A)_N$ that is taken to the crystal melter is melted: a part of the melt becomes the purified product, D, and the rest is recycled as the wash liquor, $(L_B)_N$.

The recycle ratio, R, is defined by $$R = (L_B)_N / D \quad (15)$$

There are the following material balance relations:

$$(K_A)_N = (M_A)_N + (S_A)_N \quad (16)$$

$$(K_A)_N = D + (L_B)_N \quad (17)$$

By combining equations (15), (16) and (17), one obtains $$\frac{L}{M} = \frac{(L_B)_N}{(M_A)_N} = \frac{\left(\frac{1}{M/S} + 1\right)}{\left(\frac{1}{R} + 1\right)} \quad (19)$$

This is the desired equation relating L/M to M/S and R. A high value of L/M, or equivalently a low value of M/L, is favorable to an effective crystal washing operation. It is seen that both a low value of M/S and a high value of R gives a high L/M value. A high R-value leads to a high energy consumption in the process. Therefore, it is advantageous to have a high L/M-value by having a low M/S-value. When M/S=0.345 and R=0.5, the L/M-value is 1.3. This value is used in the example to be presented.

Knowing $(Z_B)_o$, $\alpha$ and L/M, the concentrations of the retained liquids and the free liquids in the lower sub-zones can be found by following the following procedures:

Step 1. Knowing $(Z_B)_o$, find $(X_A)_1$ by equation 14.
Step 2. Knowing $(Z_B)_{i-1}$ and $(X_A)_i$, find $(X_B)_i$ by equation 10.
Step 3. Knowing $(Z_B)_{i-1}$ and $(X_B)_i$, find $(Z_A)_i$ by equation 3.
Step 4. Knowing $(X_B)_i$, find $(Z_B)_i$ by equation 11.
Step 5. Knowing $(X_B)_i$, $(Z_A)_i$, find $(X_A)_{i+1}$ by equation 12.

Steps 2 through 5 are repeated by successively increasing the i-value until the desired product purity is reached.

Lines III and IV in FIG. 1 are obtained by the procedures described. In this example, the input data used are summarized as follows:

$(Z_B)_o = 0.3$; M/S = 0.345; $\alpha$ = 0.75; L/M = 1.3.

A purification column that would have the characteristic parameters indicated is of a reasonable height. As has been described, the impurity concentrations in liquids at corresponding positions in the sub-zones form sequences that are nearly geometric sequences. Therefore, by having an adequate number of sub-zones a very pure product can be obtained. To summarize, in a purification column of the present invention, alternative stationary washing and agitated washing operations and inter sub-zone transfers of the solid phases and the free liquids are properly conducted so that the bed moving through the column refreshes itself, keeping up the performance of the column.

What we claim as our invention are as follows:

1. A process of washing a feed solid-liquid mixture containing a mass of crystals enriched with a first component and a liquid mixture containing the said first component and one or more impurity components with a mass of wash liquid, to thereby produce a mass of purified crystals and a residue containing the impurity components by alternative stationary and agitated washing operations in a purification zone containing a set of more than two stationary washing sub-zones and a set of more than one agitated washing sub-zones, said purification zone and the sub-zones having a first end and a second end and the said stationary sub-zones and agitated sub-zones being laid alternatively in the purification zone along the direction from the first end to the second end so that the first end and the second end of an agitated washing sub-zone is respectively connected to the second end of the preceeding stationary sub-zone and the first end of the succeeding stationary sub-zone, wherein the feed solid-liquid mixture is introduced at the first end of the purification zone and the wash liquid is introduced at the second end of the purification zone so that a mass of crystals and a mass of liquid exist in each sub-zone, the mass of crystals in each stationary sub-zone forming a compact bed of crystals that is permeable to the liquid in the sub-zone and the mass of crystals and the mass of liquid in each agitated sub-zone forming an agitated mass of solid-liquid mixture, and comprises the following steps:

(a) a first step of moving the compact mass of crystals in each stationary sub-zone in the direction from the first end toward the second end;

(b) a second step of moving the liquid through the compact mass of crystals in each stationary sub-zone in the direction from the second end toward the first end to thereby displace liquid from the bed and establish a concentration profile in the liquid mass in the sub-zone, impurity concentration decreasing from the first end toward the second end;

(c) a third step of transferring a solid-liquid mixture from the second end of each stationary sub-zone into the following agitated sub-zone;

(d) a fourth step of transferring a mass of liquid from the first end of each stationary sub-zone into the preceeding agitated sub-zone;

(e) a fifth step of agitating the content in each agitated sub-zone to break up crystal agglomerates and thereby release the impurities retained by the crystal mass to the free liquid;

(f) a sixth step of transferring a solid-liquid mixture from each agitated sub-zone to the following stationary sub-zone;

(g) a seventh step of transferring a mass of liquid from each agitated sub-zone to the preceeding stationary sub-zone;

(h) an eighth step of discharging a solid-liquid mixture from the second end of the purification zone, at least a part of the mixture becoming the mass of purified crystals;

(i) a ninth step of discharging a mass of liquid from the purification zone, at least a major part of the discharged liquid becoming the residue of the impurity components, wherein the process is further characterized by that the beds of compact masses of crystals in at least most of the stationary sub-zones are compacted to degrees substantially higher than the natural degrees of compaction in the sub-zones.

2. A process of claim 1, wherein a stationary sub-zone is divided into compartmitized sub-zones with solid walls to prevent the crystal bed from being agitated by the agitators in the neighboring agitation sub-zones.

3. A process of claim 1, wherein stationary sub-zones and agitated sub-zones directly connected so that the crystal bed in a stationary zone bears the force applied to the first end of the purification zone and the gravity force applied to the mass above the sub-zone and is thereby compacted to a degree substantially higher than the natural degree of compaction.

4. A process of claim 1, wherein a stationary sub-zone and an agitated sub-zone are connected through a movable perforated plate and the crystal bed in a stationary bed is compacted by a movable compacting means.

5. A process of claim 4, wherein the movable compacting means is made an intergral part of the perforated plate.

6. A process of claim 1, wherein a stationary sub-zone and an agitated sub-zone are connected through a stationary plate and the crystal bed in a stationary bed is compacted by a movable compacting means.

7. A process of claims 1 through 6 wherein an agitated sub-zone is agitated by an agitation means that is subjected to a substantially coplanar motion.

8. A process of claim 7, wherein the agitation means is fastened to a rotating means, and thereby the agitation means is subjected to a rotary motion.

9. A process of claim 7, wherein the solid-liquid mixture in an agitated sub-zone is subjected primarily to local mixing.

10. A process of claims 1 through 9, wherein the transfer of the solid-liquid mixture in Step 6 is accomplished by use of a movable scraping or shaving means.

11. A process of washing a feed solid-liquid mixture containing a mass of crystals enriched with a first component and a liquid mixture containing the said first component and one or more impurity components with a mass of wash liquid, to thereby produce a mass of purified crystals and a residue containing the impurity components by alternative stationary and agitated washing operations in a purification zone containing a set of more than two stationary washing sub-zones and a set of more than one agitated washing sub-zones, said purification zone and the sub-zones having a first end and a second end and the said stationary sub-zones and agitated sub-zones being laid alternatively in the purification zone along the direction from the first end to the second end so that the first end and the second end of an agitated washing sub-zone is respectively connected to the second end of the preceeding stationary sub-zone and the first end of the succeeding stationary sub-zone, wherein the feed solid-liquid mixture is introduced at the first end of the purification zone and the wash liquid is introduced at the second end of the purification zone so that a mass of crystals and a mass of liquid exist in each sub-zone, the mass of crystals in each stationary sub-zone forming a compact bed of crystals that is permeable to the liquid in the sub-zone and the mass of crystals and the mass of liquid in each agitated sub-zone forming an agitated mass of solid-liquid mixture, and comprises the following steps:

(a) a first step of moving the compact mass of crystals in each stationary sub-zone in the direction from the first end toward the second end;

(b) a second step of moving the liquid through the compact mass of crystals in each stationary sub-zone in the direction from the second end toward the first end to thereby displace liquid from the bed and establish a concentration profile in the liquid mass in the sub-zone, impurity concentration decreasing from the first end toward the second end;

(c) a third step of transferring a solid-liquid mixture from the second end of each stationary sub-zone into the following agitated sub-zone;

(d) a fourth step of transferring a mass of liquid from the first end of each stationary sub-zone into the preceeding agitated sub-zone;

(e) a fifth step of agitating the content in each agitated sub-zone to break up crystal agglomerates and thereby release the impurities retained by the crystal mass to the free liquid;

(f) a sixth step of transferring a solid-liquid mixture from each agitated sub-zone to the following stationary sub-zone;

(g) a seventh step of transferring a mass of liquid from each agitated sub-zone to the preceeding stationary sub-zone;

(h) an eighth step of discharging a solid-liquid mixture from the second end of the purification zone, at least a part of the mixture becoming the mass of purified crystals;

(i) a ninth step of discharging a mass of liquid from the purification zone, at least a major part of the discharged liquid becoming the residue of the impurity components, wherein the process is further characterized by that an agitated sub-zone is agitated by an agitation mean that is subjected to a substantially coplanar motion.

12. A process of claim 11, wherein the process is further characterized by that the beds of compact masses of crystals in at least most of the stationary sub-zones are compacted to degrees substantially higher than the natural degrees of compaction in the sub-zones.

13. A process of claim 11, wherein a stationary sub-zone is divided into compartmitized sub-zones with solid walls to prevent the crystal bed from being agitated by the agitators in the neighboring agitation sub-zones.

14. A process of claim 11, wherein stationary sub-zones and agitated sub-zones directly connected so that the crystal bed in a stationary zone bears the force applied to the first end of the purification zone and the gravity force applied to the mass above the sub-zone and is thereby compacted to a degree substantially higher than the natural degree of compaction.

15. A process of claim 11, wherein a stationary sub-zone and an agitated sub-zone are connected through a movable perforated plate and the crystal bed in a stationary bed is compacted by a movable compacting means.

16. A process of claim 15, wherein the movable compacting means is made an intergral part of the perforated plate.

17. A process of claim 11, wherein a stationary sub-zone and an agitated sub-zone are connected through a stationary plate and the crystal bed in a stationary bed is compacted by a movable compacting means.

18. A process of claim 11, wherein the agitation means is fastened to a rotating means, and thereby the agitation means is subjected to a rotary motion.

19. A process of claim 11, wherein the solid-liquid mixture in an agitated sub-zone is subjected primarily to local mixing.

20. A process of claims 11 through 19, wherein the transfer of the solid-liquid mixture in Step 6 is accomplished by use of a movable scraping or shaving means.

21. A process of washing a feed solid-liquid mixture containing a mass of crystals enriched with a first component and a liquid mixture containing the said first component and one or more impurity components with a mass of wash liquid, to thereby produce a mass of purified crystals and a residue containing of the impurity components by alternative stationary and agitated washing operations in a purification zone containing a set of more than two stationary washing sub-zones and a set of more than one agitated washing sub-zones, said purification zone and the sub-zones having a first end and a second end and the said stationary sub-zones and agitated sub-zones being laid alternatively in the purification zone along the direction from the first end to the second end so that the first end and the second end of an agitated washing sub-zone is respectively connected to the second end of the preceeding stationary sub-zone and the first end of the succeeding stationary sub-zone, wherein the feed solid-liquid mixture is introduced at the first end of the purification zone and the wash liquid is introduced at the second end of the purification zone so that a mass of crystals and a mass of liquid exist in each sub-zone, the mass of crystals in each stationary sub-zone forming a compact bed of crystals that is permeable to the liquid in the sub-zone and the mass of crystals and the mass of liquid in each agitated sub-zone forming an agitated mass of solid-liquid mixture, and comprises the following steps:

(a) a first step of moving the compact mass of crystals in each stationary sub-zone in the direction from the first end toward the second end;

(b) a second step of moving the liquid through the compact mass of crystals in each stationary sub-zone in the direction from the second end toward the first end to thereby displace liquid from the bed and establish a concentration profile in the liquid mass in the sub-zone, impurity concentration decreasing from the first end toward the second end;

(c) a third step of transferring a solid-liquid mixture from the second end of each stationary sub-zone into the following agitated sub-zone;

(d) a fourth step of transferring a mass of liquid from the first end of each stationary sub-zone into the preceeding agitated sub-zone;

(e) a fifth step of agitating the content in each agitated sub-zone to break up crystal agglomerates and thereby release the impurities retained by the crystal mass to the free liquid;

(f) a sixth step of transferring a solid-liquid mixture from each agitated sub-zone to the following stationary sub-zone;

(g) a seventh step of transferring a mass of liquid from each agitated sub-zone to the preceeding stationary sub-zone;

(h) an eighth step of discharging a solid-liquid mixture from the second end of the purification zone, at least a part of the mixture becoming the mass of purified crystals;

(i) a ninth step of discharging a mass of liquid from the purification zone, at least a major part of the discharged liquid becoming the residue of the impurity components;

wherein the transfer of the solid-liquid mixture in the third step is accomplished by use of a movable scraping or shaving means.

22. A process of claim 21, wherein the process is further characterized by that the beds of compact masses of crystals in at least most of the stationary sub-zones are compacted to degrees substantially higher than the natural degrees of compaction in the sub-zones.

23. A process of claim 21, wherein a stationary sub-zone is divided into compartmitized sub-zones with solid walls to prevent the crystal bed from being agitated by the agitators in the neighboring agitation sub-zones.

24. A process of claim 21, wherein stationary sub-zones and agitated sub-zones directly connected so that the crystal bed in a stationary zone bears the force applied to the first end of the purification zone and the gravity force applied to the mass above the sub-zone and is thereby compacted to a degree substantially higher than the natural degree of compaction.

25. A process of claim 21, wherein a stationary sub-zone and an agitated sub-zone are connected through a movable perforated plate and the crystal bed in a stationary bed is compacted by a movable compacting means.

26. A process of claim 25, wherein the movable compacting means is made an intergral part of the perforated plate.

27. A process of claim 21, wherein a stationary sub-zone and an agitated sub-zone are connected through a stationary plate and the crystal bed in a stationary bed is compacted by a movable compacting means.

28. A process of claims 21 through 27, wherein an agitated sub-zone is agitated by an agitation means that is subjected to a substantially coplanar motion.

29. A process of claim 28, wherein the agitation means is fastened to a rotating means, and thereby the agitation means is subjected to a rotary motion.

30. A process of claim 28, wherein the solid-liquid mixture in an agitated sub-zone is subjected primarily to local mixing.

* * * * *